United States Patent [19]

Lease

[11] Patent Number: 4,727,904
[45] Date of Patent: Mar. 1, 1988

[54] DRAIN TRAY APPARATUS

[76] Inventor: Daryl C. Lease, 6700 Tucker, Eaton Rapids, Mich. 48827

[21] Appl. No.: 29,266

[22] Filed: Mar. 23, 1987

[51] Int. Cl.⁴ .................................................. F16N 31/02
[52] U.S. Cl. .............................. 137/565; 137/355.23; 184/1.5; 184/106; 220/1 C; 280/47.37 R
[58] Field of Search .................... 137/355.23, 565; 184/1.5, 106; 220/1 C; 280/47.37 R

[56] References Cited
U.S. PATENT DOCUMENTS
1,554,589  9/1925  Long .................................. 184/1.5
4,114,644  9/1978  Piper .

Primary Examiner—Gerald A. Michalsky
Attorney, Agent, or Firm—Ian C. McLeod

[57] ABSTRACT

A drain tray apparatus (10) for collecting coolant and other fluids from an internal combustion engine including a pan (11) and tubular handle (12) is described. The pan includes a pump (15) which is used to receive coolant or other fluid from the pan and convey the fluid through the handle (12) to a hose (19) for recycling the fluid to a radiator for the engine or for disposing of the fluid down a drain. In the preferred form the pump is electrical so that it can be connected to a battery for starting the internal combustion engine.

15 Claims, 3 Drawing Figures

DRAIN TRAY APPARATUS

BACKGROUND OF THE INVENTION (1) Field of the Invention

The present invention relates to a drain tray apparatus for receiving coolant or other fluids from an internal combustion engine or radiator. In particular the present invention relates to a drain tray apparatus with a handle which serves as a fluid conduit for removing the fluid from the tray using a pump in a pan of the tray apparatus.

(2) Prior Art

U.S. Pat. No. 4,114,644 describes a drain pan or tray for removing and recycling coolant (anti-freeze) from an internal combustion engine. The problem is that the tray and hose are close to the ground and the operator must stoop and lift the apparatus upright in order to recycle the coolant.

OBJECTS

It is therefore an object of the present invention to provide a drain tray apparatus which can be operated from a standing position and which requires no lifting of the collected fluids. Further it is an object of the present invention to provide an apparatus which is simple and inexpensive to construct. These and other objects will become increasingly apparent by reference to the following description and the drawings.

IN THE DRAWINGS

FIG. 1 is a perspective view of the drain tray apparatus 10 of the present invention particularly illustrating a pan 11 and pivotable handle 12 which serves as a conduit for fluid from pump 15.

GENERAL DESCRIPTION

Figure 1:
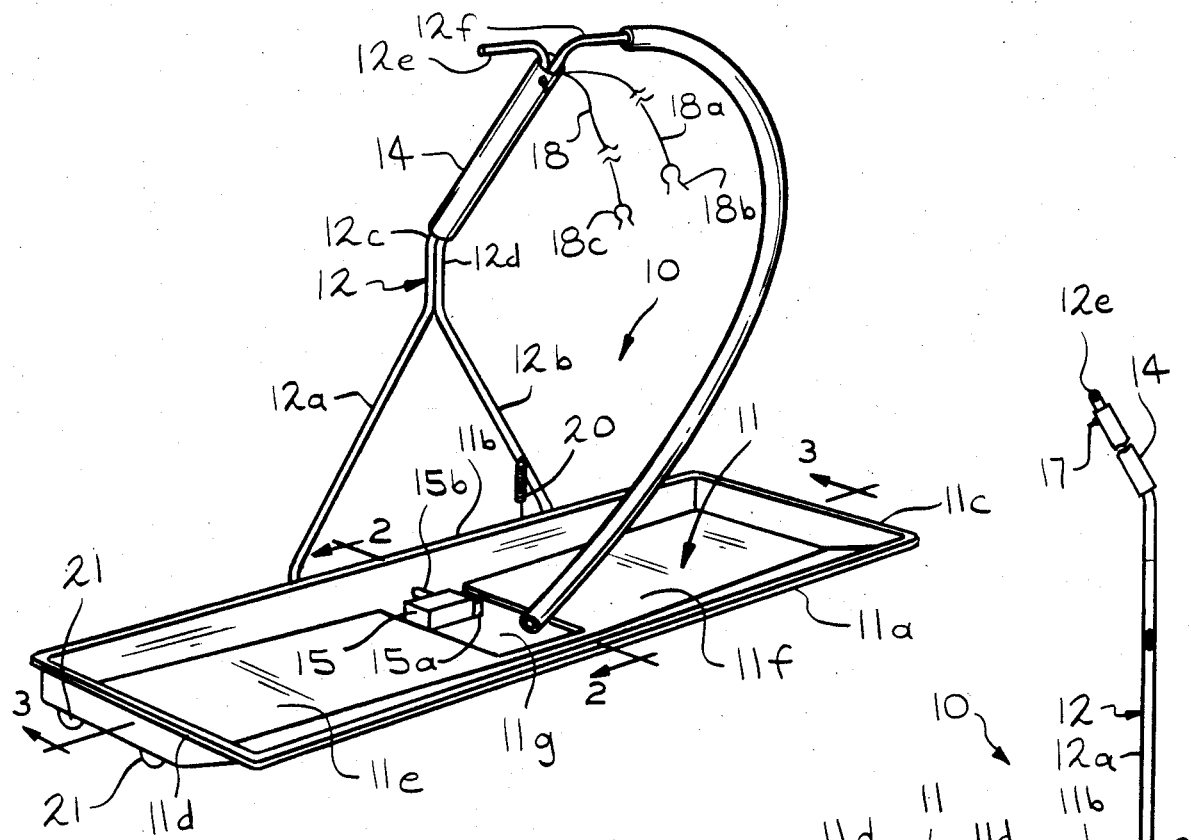

The present invention relates to an improved drain tray apparatus adapted for collecting coolant or other liquids from an internal combustion engine or radiator and for recycling the liquid to the engine or disposing of the liquid which comprises:

a pan having a bottom and sides which is adapted to be positionable beneath the internal combustion engine or radiator so as to collect liquid which flows from the engine or radiator and having a low section in the bottom of the pan in which the liquid collects;

an elongate handle pivotably attached to the pan at one end of the handles and extending from the pan and with a pair of spaced apart hand grips so as to be usable in a standing position to move the pan beneath the internal combustion engine or radiator;

a pump mounted in the low section of the pan so as to produce a flow of the collected liquid from the pan into an inlet of the pump and through an outlet from the pump;

a conduit leading from the outlet of the pump through or along the handle and through a flexible hose extending away from one of the hand grips, wherein liquid is drained into the pan from the engine or radiator and then recycled into the engine or radiator through the conduit or disposed of through the conduit by activating the pump.

Further the present invention relates to an improved tray apparatus for collecting liquid coolant or other liquids from an internal combustion engine or radiator for recycling the liquid to the engine or disposing of the liquid which comprises:

a pan having a bottom and sides which is adapted to be positionable beneath the internal combustion engine or radiator so as to collect the liquid which flows from the engine or radiator and having a low section in the bottom of the pan in which the liquid collects;

an elongate handle pivotably attached to the pan and extending from the pan and with a pair of spaced apart grips so as to be usable in a standing position to move the pan beneath the internal combustion engine or radiator, wherein the elongate handle is attached to one of the sides of the pan and comprises two pipes which are joined together in a center section, are spaced apart in a Y at one end which attaches to the pan and which have spaced apart sections forming the grips at the opposite end;

an electrically powered pump mounted in the low section of the pan so as to produce a flow of the liquid from the pan into an inlet of the pump and through an outlet from the pump;

a first hose leading from the grip of one pipe of the handle;

a second hose between the outlet of the pump and the one of the pipes, wherein the liquid flows from the pan into the pump through the second hose into the one pipe and out the first hose and is recycled to the engine or radiator or disposed of through the first hose by electrically activating the pump;

wheels mounted beneath the bottom portion of the pan; and an electrical switch mounted on the handle adjacent to or on the grip which activates the pump.

SPECIFIC DESCRIPTION

Figure 2:
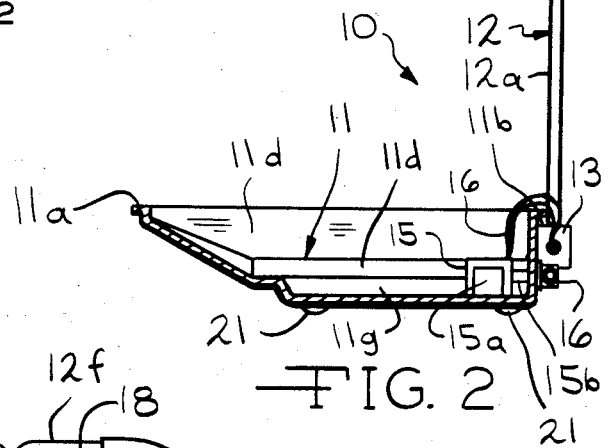
FIG. 2 is a side cross-sectional view along line 2—2 of FIG. 1.
Figure 3:
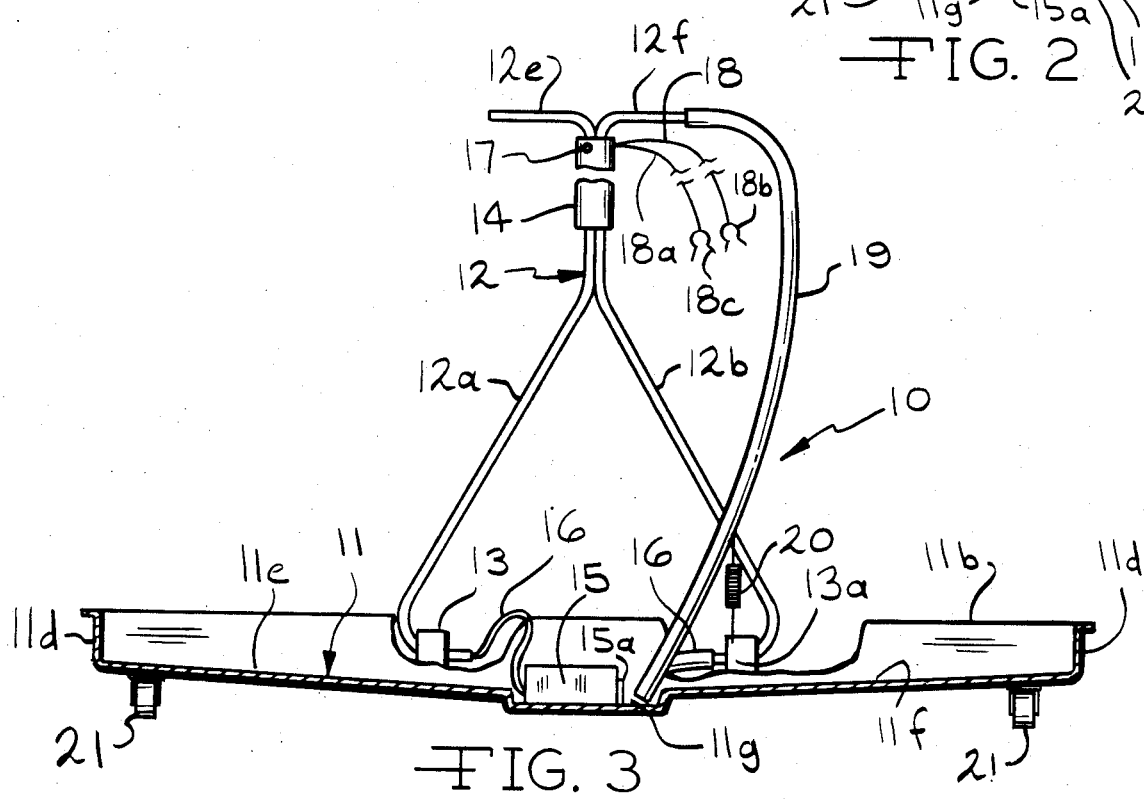
FIG. 3 is a front cross-sectional along line 3—3 of FIG. 1.

FIGS. 1 to 3 show the drain tray apparatus 10 of the present invention. A pan 11 supports an elongate tubular handle 12. The pan 11 includes front side 11a and opposed rear side 11b, lateral sides 11c and 11d, lateral bottom portions or sections 11e and 11f and central bottom low section 11g. The front side 11a angles into the low section 11g and the lateral sections 11e and 11f angle down into the low section 11g. The handle 12 includes two separate tubes with lower handle portions 12a and 12b forming a "Y", two central handle portions 12c and 12d joined together, and two handle grips 12e and 12f. The lower handle portions 12a and 12b are pivoted on supports 13 and 13a mounted on the rear side 11b of the pan 11. A C-shaped plate 14 holds the central handle portions 12c and 12d together.

A pump 15 is mounted in the central bottom portion 11g of the pan 11 and has an inlet 15a. An outlet 15b goes through the rear side 11b of pan 11 and is connected by hose 16 to lower handle portion 12b of handle 12. Wires 16 are connected to switch 17 on plate 14 through lower handle portion 12a of handle 12 allowing the pump 15 to be turned off. Leads 18 and 18a are provided to connect to a battery for an internal combustion engine (not shown) by means of clips 18b and 18c. A hose 19 leads from grip 12f which is used to direct fluid back into the cooling system of the internal combustion engine or radiator or down the drain.

A coil spring 20 is attached to support 13a or pan 11 and urges handle 12 into the upright rest position shown particularly in FIG. 2. Wheels 21 are provided on the underside of the pan 11.

In operation the pan 11 is moved beneath the internal combustion engine adjacent the cooling system. Generally this will be adjacent the radiator which has a stopcock which opens for removing coolant from the cooling system. After the coolant is removed, the cables 18 and 18a are connected to a battery by means of clips 18b and 18c. Switch 17 is activated and the coolant is returned to the radiator or disposed of into a drain. Then fluids (oil) can be collected and recycled or collected separately.

Generally the sides 11c and 11d of pan 11 have a length and width to fit between the wheels of a vehicle and collect the coolant. The rectangular cross-section of the pan 11 in plan view is preferred.

Numerous variations will occur to those skilled in the art. For instance the pump 15 can be operated by compressed air usually available in automotive or truck repair shops at construction sites. A conventional electrical plug could be used (not shown). It is intended that all of these variations be included within the scope of the present invention.

I claim:

1. An improved drain tray apparatus adapted for collecting coolant or other liquids from an internal combustion engine or radiator and for recycling the liquid to the engine or radiator or disposing of the liquid which comprises:
   (a) a pan having a bottom and sides which is adapted to be positionable beneath the internal combustion engine or radiator so as to collect liquids which flow from the engine or radiator and having a low section in the bottom of the pan in which the liquid collects;
   (b) an elongate handle pivotably attached to the pan at one end of the handle and extending from the pan and with a pair of spaced apart hand grips so as to be usable in a standing position to move the pan beneath the internal combustion engine or radiator;
   (c) a pump mounted in the low section of the pan so as to produce a flow of the collected liquid from the pan into an inlet of the pump and through an outlet from the pump;
   (d) a conduit leading from the outlet of the pump between the handle and the grips and through a flexible hose extending away from one of the hand grips, wherein liquid is drained into the pan from the engine or radiator and then recycled into the engine or radiator through the conduit or disposed of through the conduit by activating the pump.

2. The drain tray apparatus of claim 1 wherein the pan has a height, width and length which allows the pan to be positioned beneath the radiator of a wheeled vehicle with the internal combustion engine.

3. The drain tray apparatus of claim 2 wherein the pan has a rectangular cross-section defined by spaced apart long sides defining the width of the pan to be positioned between the wheels of the vehicle and spaced apart short sides defining the length of the pan and wherein the elongate handle is pivotably attached adjacent a center portion of one of the long sides of the pan.

4. The drain tray apparatus of claim 3 wherein the low section of the pan is adjacent the handle and a center portion of one of the long sides of the pan.

5. The drain tray apparatus of claim 4 wherein the other of the long sides angles outward from the bottom of the pan away from the low section and wherein the bottom of the pan includes lateral sections of the bottom which angle downward into the low section of the bottom.

6. The drain tray apparatus of claim 1 wherein wheels are mounted beneath the bottom of the pan which allow the tray to be rolled into position using the handle.

7. The drain tray apparatus of claim 1 wherein the elongate handle is attached to one of the sides of the pan at the one end and comprises two pipes which are joined together in a center section, are spaced apart in a Y at one end which attaches to the pan and wherein each pipe has spaced apart sections which form the grips at an opposite end of the handle.

8. The drain pan apparatus of claim 7 wherein liquid flows through one of the pipes at one leg of the Y, through the center section and through the spaced apart section which forms one grip.

9. The drain pan apparatus of claim 8 wherein the pipe acts as part of the conduit for the liquid and wherein a first hose is connected from the pump outlet to the one leg of the Y of the pipe and a second hose leads from the one grip.

10. The drain tray apparatus of claim 1 wherein the pump is electrically powered and wherein a switch for the pump is provided adjacent the hand grip on the handle.

11. The drain tray apparatus of claim 1 wherein a spring means is provided between the pan and the handle so that the handle is pivoted into an upright rest position when not in use.

12. An improved tray apparatus adapted for collecting liquid coolant or other liquids from an internal combustion engine or radiator for recycling the liquid to the engine or disposing of the liquid which comprises:
   (a) a pan having a bottom and sides which is adapted to be positionable beneath the internal combustion engine or radiator so as to collect the liquid which flows from the engine or radiator and having a low section in the bottom of the pan in which the liquid collects;
   (b) an elongate handle pivotably attached to the pan and extending from the pan and with a pair of spaced apart grips so as to be usable in a standing position to move the pan beneath the internal combustion engine or radiator, wherein the elongate handle is attached to one of the sides of the pan and comprises two pipes which are joined together in a center section, are spaced apart in a Y at one end which attaches to the pan and which have spaced apart sections forming the grips at the opposite end;
   (c) an electrically powered pump mounted in the low section of the pan so as to produce a flow of the liquid from the pan into an inlet of the pump and through an outlet from the pump;
   (d) a first hose leading from the grip of one pipe of the handle;
   (e) a second hose between the outlet of the pump and the one of the pipes, wherein the liquid flows from the pan into the pump through the second hose into the one pipe and out the first hose and is recycled to the engine or radiator or disposed of through the first hose by electrically activating the pump;
   (f) wheels mounted beneath the bottom portion of the pan; and
   (g) an electrical switch mounted on the handle which activates the pump.

13. The apparatus of claim 12 wherein a spring means is provided between the handle and the pan so that the handle is pivoted into an upright rest position when not in use.

14. The drain tray apparatus of claim 12 wherein the pan has a height, width and length which allows the pan to be positioned beneath the radiator of a cooling system of an internal combustion engine and between wheels of the vehicle.

15. The drain tray apparatus of claim 14 wherein the pan has a rectangular cross-section defined by long sides defining the width of the pan and short sides defining the length of the pan, wherein the elongate handle is pivotably attached adjacent a center portion of one of the long sides of the pan, wherein the low section of the pan is adjacent the attachment of the handle to the pan, wherein the other of the long sides angles outward from the bottom of the pan away from the low section and wherein the bottom of the pan includes lateral sections which angle downward into the low section.

* * * * *